United States Patent [19]

Jödden et al.

[11]  4,385,041
[45]  May 24, 1983

[54] PROCESS FOR MAKING AQUEOUS ALKALI METAL PHOSPHATE SOLUTIONS

[75] Inventors: Klaus Jödden, Hürth; Gero Heymer, Erftstadt, both of Fed. Rep. of Germany

[73] Assignee: Hoechst Aktiengesellschaft, Fed. Rep. of Germany

[21] Appl. No.: 326,078

[22] Filed: Nov. 30, 1981

[30] Foreign Application Priority Data

Dec. 3, 1980 [DE] Fed. Rep. of Germany ....... 3045588

[51] Int. Cl.$^3$ .................. C01B 15/16; C01B 25/26
[52] U.S. Cl. .................................. 423/312; 423/305; 423/307; 423/308
[58] Field of Search .............. 423/305, 307, 308, 309, 423/311, 312, 313; 252/449, 455 R

[56] References Cited

U.S. PATENT DOCUMENTS 4,278,647  7/1981  Jodden et al. ..................... 423/317

FOREIGN PATENT DOCUMENTS 2833380  2/1980  Fed. Rep. of Germany .

OTHER PUBLICATIONS

Gmelim, Hanbuch der Anorganischen Chemie, 8 ed., vol. Phosphorus, Part C, 1965, p. 129.

Primary Examiner—O. R. Vertiz
Assistant Examiner—Gregory A. Heller
Attorney, Agent, or Firm—Connolly and Hutz

[57] ABSTRACT

The invention relates to a process for making aqueous alkali metal phosphate solutions by subjecting aqueous alkali metal phosphite solutions to catalytic oxidation with oxygen or air. More particularly, oxygen or air in stoichiometric excess proportions is introduced into the aqueous alkali metal phosphite solution at about 30° to 110° C., at a pH-value of 0 to about 8, and in the presence of $SiO_2$ or aluminum silicate containing at most 10 weight % $Al_2O_3$, for as long as necessary to achieve conversion of the alkali metal phosphite to alkai metal phosphate. After completion of the oxidation, the aqueous solution is separated from the catalyst.

8 Claims, No Drawings

PROCESS FOR MAKING AQUEOUS ALKALI METAL PHOSPHATE SOLUTIONS

The present invention relates to a process for making aqueous alkali metal phosphate solutions by subjecting aqueous alkali metal phosphite solutions to catalytic oxidation.

The production of hydrogen phosphide by subjecting yellow phosphorus to a disproportionation reaction in sodium hydroxide solution invariably entails the formation of considerable quantities of aqueous sodium phosphite solutions. More particularly, in the event of high yields of $PH_3$, about 65 to 75% of the phosphorus used is converted to commercially unattractive trivalent phosphorus compounds, for which it is necessary to be worked up into more useful material, for reasons of costs and environmental protection.

By spraying crude phosphate on to a phosphite solution, it is indeed possible to use the latter for the production of elementary phosphorus. This, however, is a process of the kind, wherein relatively pure phosphorus-III-compounds are converted to less valuable crude phosphate. In addition to this, it has been described that it is possible for dissolved phosphites to be converted pyrolytically to solid phosphates of different composition. Another process for utilizing waste phosphite solutions has been described in DE-OS No. 28 33 380, wherein sodium phosphite is converted to phosphorous acid by saturating the aqueous solutions with hydrogen chloride, the sodium ion being quantitatively precipitated in the form of NaCl.

It is therefore an object of this invention to provide a process permitting aqueous solutions of alkali metal phosphites to be oxidized so as to obtain pure alkali metal phosphates. In other words, the invention provides for widespread unproblematic uses of phosphite waste solutions. Thus, it is possible for sodium phosphate solutions which are commercially produced by methods other than described above, to be admixed with the phosphate solutions obtained by subjecting phosphites to oxidation.

It is generally accepted that the inorganic salts of trivalent phosphorus, which by reason of their redox potential have to be regarded as being strong reducing agents, are very stable to the action of oxidants, such as $H_2O_2$, air and oxygen. As reported, e.g. in Gmelins Handbuch der anorganischen Chemie, 8th edition, volume phosphorus, part C (1965), page 129, at most 4% $H_3PO_3$ is oxidized to $H_3PO_4$ upon the introduction into, and passage of air through, aqueous $H_3PO_3$ at 90° C. over a period of 3 hours, the oxidation remaining uncatalyzed by the use of finely divided Pt. Even phosphorous acid treated with $H_2O_2$ at boiling temperature has been found to undergo reluctant and incomplete oxidation only. On the other hand, it has been stated in Gmelins Handbuch (loc. cit) that $H_3PO_3$ undergoes rapid oxidation in the presence of finely divided palladium and in an $O_2$-atmosphere. To this end, it is, however, necessary for the palladium to be used in the relatively large proportion of 70 weight %, based on $H_3PO_3$.

We have now found that trivalent phosphorus compounds which are dissolved in water can be oxidized considerably more rapidly than heretofore with the use of oxygen in the presence of a catalyst made from porous alumino-silicate material. Thus, for example, 30% of the trivalent phosphorous present in a solution which contained 3.8% P-(III) and 8.2% P-(V), was found to have been converted to pentavalent phosphorus in the presence of the catalyst carrier (200 g of solution; pH=2; 60 g catalyst KA; 95° C.; 20 l/h $O_2$). In contrast with this no appreciable oxidation could be found to have occurred in the absence of the above aluminosilicate catalyst.

The present invention relates more particularly to a process for making aqueous alkali metal phosphate solutions by subjecting aqueous alkali metal phosphite solutions to catalytic oxidation by means of oxygen or air, which comprises: introducing oxygen or air into the aqueous alkali metal phosphite solution or into an aqueous solution of alkali metal phosphites and alkali metal phosphates having a temperature of about 30° to 110° C., a pH-value within the range 0 to about 8, in the presence of a catalyst based on $SiO_2$ or alumino-silicate containing at most 10 weight % of $Al_2O_3$, the $SiO_2$ or alumino-silicate having optionally finely divided palladium applied thereto, and the oxygen or air being introduced in stoichiometric excess proportions for as long as necessary to achieve conversion of the alkali metal phosphite to alkali metal phosphate, and, after completion of the oxidation, separating the aqueous phase from the catalyst.

The starting materials which should preferably be used comprise commercial alkali metal phosphite solutions, such as those which are obtained in the production of hydrogen phosphide by disproportionation of yellow phosphorus in sodium hydroxide solution, and have a pH within the range 8 to 14. The pH-value deemed desirable in one case or other can incidentally be established by adding a mineral acid, such as phosphoric acid, to the phosphite solution. It has also been found preferable to use the $SiO_2$ or alumino-silicate in the form of porous pellets.

Alumino-silicate catalysts produced by Südchemie AG., München and designated hereinafter as catalyst carriers KA-1, KA-2, KA-3 and KA-4, respectively, have been found to be especially useful in the process of this invention. Their activity can be significantly improved by applying finely divided palladium on to the surface area of the alumino-silicate, which can be used in the form of pellets.

The palladium concentration on the $SiO_2$ or alumino-silicate should be equal to at most about 5 weight %, preferably 0.01 to 1.0 weight %. In the event of more than 0.05 weight % of Pd being used, the oxidation velocity of the phosphite remains practically unaffected by the quantity of Pd actually applied to the carrier material. The catalyst described hereinabove, which is generally used in a proportion of about 500 to 5000 g per liter phosphite solution, enables the phosphite to be oxidized within a period of 7 to 12 hours at a preferred temperature within the range 80° to 100° C.

The process of this invention compares favorably with the prior art inasmuch as it permits alkali metal phosphites to be catalytically oxidized to alkali metal phosphates in aqueous solution with the use of a commercially attractive alumino-silicate catalyst. By admixing the alumino-silicate catalyst with palladium, whose catalytic efficiency in the oxidation of phosphites is generally accepted, it is possible for the activity of the catalyst to be considerably improved; to this end, the noble metal is required to be used in proportions significantly smaller than those which would be necessary if the noble metal were used alone.

EXAMPLE 1

(A) Preparation of palladium/alumino-silicate catalyst

To prepare the palladium/alumino-silicate catalyst, a commercially available product, designated as catalyst carrier KA-1, a product of Südchemie AG, München, was used. The alumino-silicate had the following characteristic data:
- (a) Diameter of pellets: 5 mm
- (b) Apparent density: 530 g/l
- (c) Composition of silicate: 91.1 wgt % $SiO_2$ 1.8 wgt % $Al_2O_3$
- (d) X-ray diffraction diagram of silicate: very strong peak at $\delta = 13.38$ The d-values and relative intensities of the KA-1 product ($CuK_\alpha$-irradiation) are indicated in the following Table:

d—rel. intensity
9.8—2
4.94—1
4.23—3
3.33—10
2.57—1
2.45—1
2.27—1
2.23—1
2.13—1
1.99—1
1.82—1

100 g of the alumino-silicate, which had a water absorptive power of 65 cm$^3$/100 g, was impregnated for 30 minutes at 40° C. with 13.3 g of a 20 weight % solution of $PdCl_2$ which was diluted with 126 ml water. Next, the alumino-silicate pellets were freed from supernatant solution by decantation, the pellets were dried at 110° C., and the $PdCl_2$ adsorbed on the pellets was reduced at 40° C. with the aid of a 10 weight % aqueous hydrazin solution admixed with 4 weight % NaOH. The catalyst was washed with water and dried at 110° C.

(B) Oxidation of monosodium phosphite in aqueous solution with the use of the catalyst prepared as described under (A)

50 g of the catalyst prepared as described under (A) was placed in a glass tube which was closed by means of a D1-frit, and 200 g of an aqueous 15.8 weight % solution of $NaH_2PO_3$ heated to 95° C. was poured thereover. The catalyst so treated contained 0.8 weight % Pd. 20 liter per hour oxygen was introduced, through the frit, into the aqueous solution, and the $NaH_2PO_3$ was oxidized. The solution had a pH-value of 2.0.

After 8 hours, the phosphite was found to have been completely converted to sodium phosphate.

EXAMPLE 2

The procedure was as in Example 1, but 200 g of an aqueous sodium phosphite/sodium phosphate solution was used. It contained 4.1 weight % of P-(III) and 6.3 weight % of P-(V) and had a pH-value of 4.2. The following Table indicates the decrease, related to time, of the phosphite content, calculated as P-(III):

| Hours | 0 | 2 | 4 | 6 | 8 | 10 |
|---|---|---|---|---|---|---|
| Wgt % P-(III) based on total P-content | 39.4 | 32.8 | 27.8 | 15.2 | 5.4 | 0 |

EXAMPLE 3

The procedure was as in Example 1, but 200 g of an aqueous sodium phosphite/sodium phosphate-solution was used. It contained 4.0 weight % P-(III) and 2.4 weight % P-(V) and had a pH-value of 6.5. 60 g catalyst was used. The phosphite concentration, calculated as P-(III), decreased as follows:

| Hours | 0 | 2 | 4 | 6 | 8 | 10 |
|---|---|---|---|---|---|---|
| Wgt % P-(III) based on total P-content | 62.5 | 49.7 | 40.8 | 33.0 | 28.1 | 22.8 |

EXAMPLE 4

The procedure was as in Example 1, but 200 g of an aqueous sodium phosphite/sodium phosphate-solution was used. It contained 3.75 weight % P-(III) and 8.2 weight % P-(V) and had a pH-value of 2.0. 50 g of Pd-free catalyst carrier KA-1 was used as the catalyst. After 10 hours, the P-(III) concentration was found to have been reduced from 31.4 down to 20 weight %, based on the total P-content.

EXAMPLE 5

The procedure was as in Example 4, but the catalyst was 50 g of a Pd-free commercially available molecular sieve with a pore width of 5 Å, a product of Merck AG, Darmstadt. It had a Si:Al-ratio of about 1:1. After 10 hours, the P-(III) concentration was found to have been reduced from 31.4 down to 18 weight %, based on the total P-content.

EXAMPLE 6

200 g of a solution with the composition indicated in Example 4 was contacted at 95° C. with 20 l/h air in the presence of 50 g catalyst which contained 0.1 weight % Pd. The P-(III) concentration was found to decrease as follows:

| Hours | 0 | 2 | 4 | 6 | 8 | 10 |
|---|---|---|---|---|---|---|
| Wgt % P-(III) based on total P-content | 31.4 | 25.0 | 19.3 | 15.8 | 9.6 | 0 |

EXAMPLE 7

2.2 kg of an aqueous sodium phosphite/sodium phosphate solution which contained 4.1 weight % P-(III) and 6.3 weight % P-(V) was continuously circulated by means of a pump (performance = 54 l/h) in a spray tower filled with 550 g catalyst. Introduced thereinto cocurrently with the above solution was 100 l/h air, and the whole was reacted at 88° C. at a pH of 4.0. The catalyst consisted of alumino-silicate as described in Example 1 with 0.1 weight % Pd. Under the conditions described, the P-(III)-concentration was found to decrease as follows:

| Hours | 0 | 2 | 4 | 6 | 8 | 10 | 12 |
|---|---|---|---|---|---|---|---|
| Weight % P-(III) based on total P-content | 39.4 | 22.9 | 15.7 | 11.1 | 5.2 | 2.7 | 0.4 |

EXAMPLE 8

The experiment described in Example 7 was repeated save that the quantity of catalyst used was doubled. After 7 hours, the oxidation was complete.

We claim:

1. A process for making an aqueous alkali metal phosphate solution by subjecting an aqueous solution of alkali metal phosphite or an aqueous solution of alkali metal phosphite and alkali metal phosphate to oxidation with oxygen or air in the presence of a catalyst, which comprises: introducing oxygen or air into the aqueous alkali metal phosphite solution or into the aqueous solution of alkali metal phosphite and alkali metal phosphate having a temperature of about 30° to 110° C., a pH-value within the range 0 to about 8, in the presence of a $SiO_2$ or an aluminosilicate catalyst containing at most 10 weight % of $Al_2O_3$, the oxygen or air being introduced in stoichiometric excess proportions for as long as necessary to achieve conversion of the alkali metal phosphite to alkali metal phosphate, and after completion of the oxidation, separating the aqueous phase from the catalyst.

2. The process as claimed in claim 1, wherein a commercial alkali metal phosphite solution obtained as a by-product in the production of hydrogen phosphide by subjecting yellow phosphorus to a disproportionation reaction in sodium hydroxide solution, and having a pH-value within the range 8 to 14 is used.

3. The process as claimed in claim 1, wherein the alkali metal phosphites are reacted at a temperature within the range 70° to 100° C. and at a pH-value of the aqueous solution within the range 1 to 5.

4. The process as claimed in claim 1, wherein the $SiO_2$ or alumino-silicate catalyst is used in the form of pellets.

5. The process as claimed in claim 1, wherein the alumino-silicate catalyst is used in the form of pellets which have an average diameter of 5 mm, an apparent density of 530 g/l, and a water absorptive power of 65 ml/100 g, the alumino-silicate catalyst containing 91.1 weight % $SiO_2$ and 1.8 weight % $Al_2O_3$, and presenting a strong peak at $\delta = 13.38$ in the X-ray diffraction diagram.

6. The process as claimed in claim 1, wherein the $SiO_2$ or alumino-silicate catalyst has finely divided palladium applied thereto.

7. The process as claimed in claim 1, wherein the palladium concentration on the $SiO_2$ or alumino-silicate catalyst is equal to at most about 5 weight %, preferably 0.01 to 1.0 weight %.

8. The process as claimed in claim 1, wherein the catalyst and the solution of phosphite or solution of phosphite and phosphate are contacted with one another in a quantitative ratio of 500 to 5000 g catalyst per liter solution.

* * * * *